United States Patent
Funazaki et al.

(10) Patent No.: US 9,697,122 B2
(45) Date of Patent: Jul. 4, 2017

(54) DATA PROCESSING DEVICE

(71) Applicant: DENSO CORPORATION, Kariya, Aichi-pref. (JP)

(72) Inventors: Tomoyoshi Funazaki, Kariya (JP); Hirofumi Yamamoto, Obu (JP)

(73) Assignee: DENSO CORPORATION, Kariya (JP)

( * ) Notice: Subject to any disclaimer, the term of this patent is extended or adjusted under 35 U.S.C. 154(b) by 311 days.

(21) Appl. No.: 14/643,375

(22) Filed: Mar. 10, 2015

(65) Prior Publication Data

US 2015/0278095 A1    Oct. 1, 2015

(30) Foreign Application Priority Data

Mar. 25, 2014   (JP) .................................. 2014-62013

(51) Int. Cl.
   *G06F 12/08*    (2016.01)
   *G06F 12/0813*  (2016.01)
   *G06F 15/173*   (2006.01)

(52) U.S. Cl.
   CPC .... *G06F 12/0813* (2013.01); *G06F 15/17375* (2013.01); *G06F 2212/154* (2013.01)

(58) Field of Classification Search
   CPC ........... G06F 12/0813; G06F 15/17375; G06F 2212/154
   See application file for complete search history.

(56) References Cited

U.S. PATENT DOCUMENTS

| | | | |
|---|---|---|---|
| 5,528,761 A | 6/1996 | Ooba et al. | |
| 5,787,301 A * | 7/1998 | Arakawa ............. | G06F 13/4022 709/248 |
| 6,466,988 B1 * | 10/2002 | Sukegawa ........... | G06F 12/0815 709/248 |
| 2006/0129718 A1 * | 6/2006 | Stromqvist ........... | G06F 9/3879 710/57 |
| 2006/0212868 A1 * | 9/2006 | Takayama .................. | G06F 9/52 718/100 |
| 2008/0022142 A1 * | 1/2008 | Nishioka ............... | G06F 9/3851 713/375 |
| 2009/0193228 A1 | 7/2009 | Kasahara et al. | |

FOREIGN PATENT DOCUMENTS

JP         07-234841 A        9/1995

* cited by examiner

*Primary Examiner* — Ryan Bertram
(74) *Attorney, Agent, or Firm* — Posz Law Group, PLC

(57) ABSTRACT

A data processing device includes: data processing stages having a processing element, a stage memory and an event controller; and an inter-stage bus connecting the stages via an access point. External and process completion events are input into the controller for generating a task start event toward the processing element according to the external and process completion events. Each access point has an access table storing a data write history when the processing element writes data in the memory in a memory access process. The processing element executes an event access process indicative of memory access process completion after the processing element completes the memory access process to the memory via the access point. The access point executes another event access process for inputting the process completion event into the controller of another stage, based on the data write history when the processing element executes the event access process.

10 Claims, 19 Drawing Sheets

FIG. 15
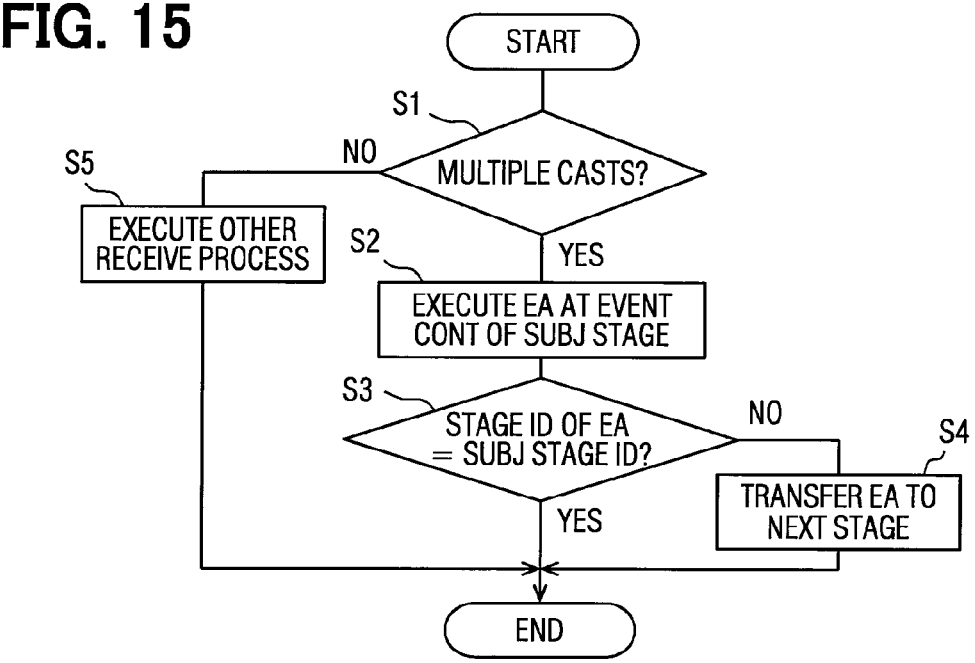
FIG. 16
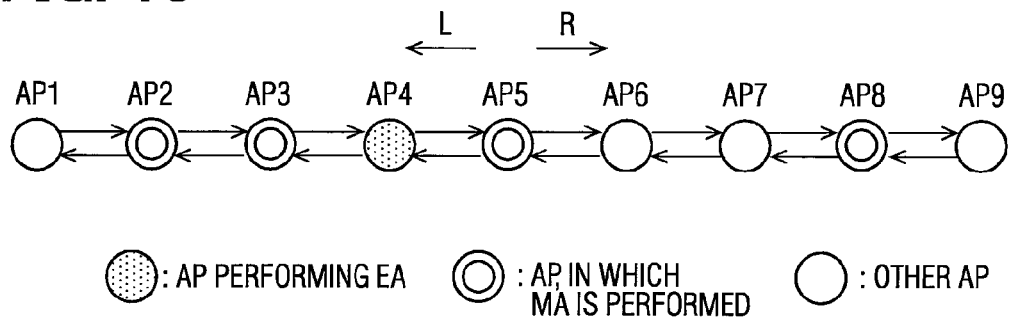
FIG. 17
| AP | L | R |
|----|---|---|
| 2  | 2 | - |
| 3  | 1 | - |
| 5  | - | 1 |
| 8  | - | 4 |

○ : AP PERFORMING EA   ◎ : AP IN WHICH MA IS PERFORMED   ○ : OTHER AP

| AP | CW |
|----|----|
| 2  | 1  |
| 3  | 2  |
| 5  | 4  |
| 6  | 5  |

| AP | CW | CCW |
|----|----|-----|
| 2  | 1  | 7   |
| 3  | 2  | 6   |
| 7  | 6  | 2   |

DATA PROCESSING DEVICE

CROSS REFERENCE TO RELATED APPLICATION

This application is based on Japanese Patent Application No. 2014-62013 filed on Mar. 25, 2014, the disclosure of which is incorporated herein by reference.

TECHNICAL FIELD

The present disclosure relates to a data processing device having multiple data processing stages connected to each other via a bus. Each data processing stage includes one or more processing elements.

BACKGROUND

In a multi-core system having a disturbed shared memory type structure (i.e., a non-uniform memory access type structure or a NUMA type structure), multiple processors are connected to each other via a bus. In the system, in order to perform a processing in parallel to each other at each processor, it is necessary to synchronize the processing between the processors. Various techniques for synchronizing between the processors are proposed. For example, a synchronizing method using a common variable is disclosed in JP-H04-312160 A (corresponding to U.S. Pat. No. 5,528,761). A synchronizing method using a barrier is disclosed in JP-2013-137833 A (corresponding to US 2009/0193228). Further, a synchronizing method using a message in order to effectively process an event, which is generated asynchronously, is described in JP-H07-234841 A.

In the system having the MUMA type structure, when the synchronizing method using the common variable or the barrier is applied to the system, multiple cores accesses the common variable and the barrier resistor. Accordingly, as the number of cores increases, the process efficiency is reduced. Further, since, in the method for synchronizing by sending and receiving the message, a synchronizing control is complicated when the number of cores increases. Similarly, in this case, the processing efficiency is also reduced.

SUMMARY

It is an object of the present disclosure to provide a data processing device having a plurality of data processing stages, which are connected to each other via a bus, and synchronizing between processing elements without reducing a processing efficiency.

According to an example aspect of the present disclosure, a data processing device includes: a plurality of data processing stages, each of which includes at least one processing element, at least one stage memory, and an event controller; and an inter-stage bus that connects between the plurality of data processing stages, and is a data write only bus. The processing element in one data processing stage is connected to the stage memory in the one data processing stage via a data read only bus. The processing element is connected to the inter-stage bus via a second data write only bus. An external event generated at an external device and a process completion event from the processing element are input into the event controller. The event controller in the one data processing stage generates a task start event with respect to the processing element in the one data processing stage according to each of the external event and the process completion event. Each of the plurality of data processing stages is connected to the inter-stage bus via an access point. The access point includes an access table. The access point stores a data write history in the access table when the processing element writes data in the stage memory in a memory access process. The processing element executes an event access process indicative of a completion of the memory access process after the processing element completes to execute the memory access process to the stage memory via the access point. The access point executes another event access process for inputting the process completion event into the event controller of a data processing stage including the stage memory, in which the processing element writes data, based on the data write history stored in the access table when the processing element executes the event access process.

In the above data processing device, the synchronization of the processes executed by the processing elements between different data processing stages is effectively performed. Further, each access point executes the event access process to only the data processing stage, in which the memory access process is actually performed by the processing element, and therefore, the usage of the inter-stage bus is minimized, and the band of the inter-stage bus is effectively used, so that the process efficiency is improved.

BRIEF DESCRIPTION OF THE DRAWINGS

The above and other objects, features and advantages of the present disclosure will become more apparent from the following detailed description made with reference to the accompanying drawings. In the drawings:

FIG. 15 is a flowchart showing a process of a RXC corresponding to the multiple casts;

FIG. 16 is a diagram showing an example where the multiple casts are performed at a slotted bus in two directions according to a third embodiment;

FIG. 17 is a diagram showing the number of hops for performing the EA at each stage;

DETAILED DESCRIPTION

First Embodiment

Figure 1:
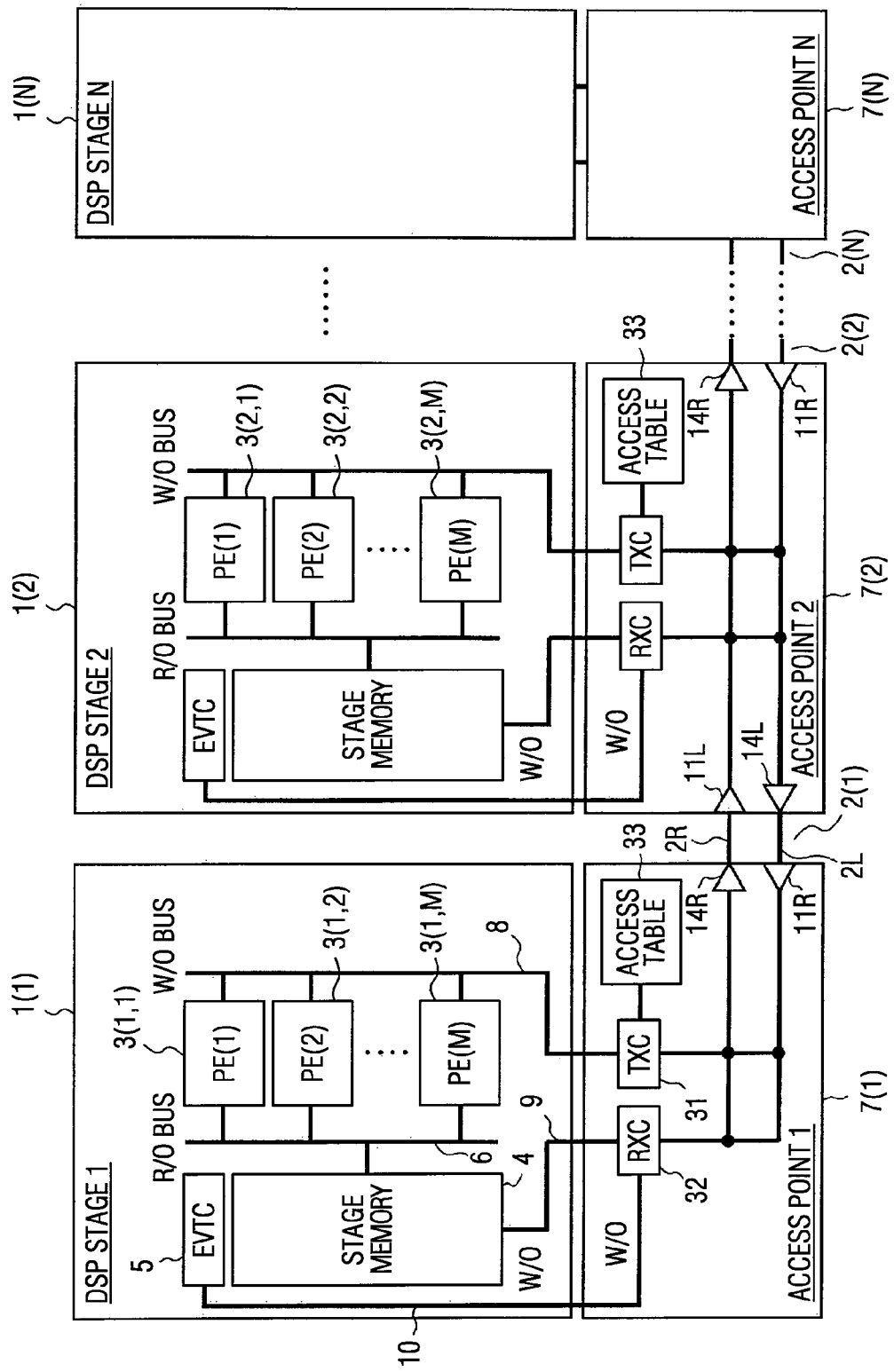
FIG. 1 is a block diagram showing a functional structure of a data processing device according to a first embodiment.

As shown in FIG. 1, a data processing device according to a first embodiment includes multiple digital signal processing stages 1(1), 1(2), . . . 1(N), which are connected to each other via a slotted bus 2(1), 2(2), . . . 2(N−1). Here, the digital signal processing stage 1(1), 1(2), . . . 1(N) is collectively defined as a DSP stage 1, and the slotted bus 2(1), 2(2), . . . 2(N−1) is collectively defined as the slotted bus 2, which is a bi-directional bus. Each DSP stage 1(1), 1(2), . . . 1(N) as a data processing stage includes multiple processing elements (i.e., PEs) 3(1, 1), 3(1, 2), . . . 3(1, M), . . . 3(N, M), a stage memory 4, and an event controller (i.e., EVETC) 5. Each PE 3(1, 1), 3(1, 2), . . . 3(1, M), . . . 3(N, M) is collectively defined as a PE 3. Each PE 3 and the stage memory 4 are connected to each other via a data read only bus 6. Here, the PE 3 includes, for example, a DSP.

The DSP stage 1 is connected to the slotted bus 2 (i.e., inter-stage bus) via an access point 7. Each PE 3 and the access point 7 are connected to each other via the data write only bus 8. The access point 7 and the stage memory 4 are connected to each other via a data write only bus 9. The slotted bus 2 includes a right direction bus 2R and a left direction bus 2L. The right direction bus 2R transmits data to a right direction of the drawing in FIG. 1. The left direction bus 2L transmits the data to a left direction of the drawing in FIG. 1. The left direction bus 2L is independent from the right direction bus 2R.

The access point 7 includes a TXC (transmitting controller) 31, a RXC (receiving controller) 32 and an access table 33. The TXC 31 is connected to a data write only bus 8 and connected to the access table 33. The RXC 32 is connected to a data write only bus 9, and connected to an event controller 5 via a data write only bus 10.

The access point 7(2) corresponding to the DSP stage 1(2) includes an input buffer 11L, 11r and an output buffer 14L, 14R. The data input from the access point 7(1) adjacent to the access point 7(2) on the left side via the input buffer 11L is capable of outputting to the access point 7(3) adjacent to the access point 7(2) on the right side and not shown via the output buffer 14R. The data input from the access point 7(3) via the input buffer 11R is capable of outputting to the access point 7(1) via the output buffer 14L. Each access point 7(1), 7(2), . . . 7(N) is collectively defined as a access point 7. The output terminal of the TXC 31 is connected to the output terminal of the input buffer 11L, 11R and the input terminal of the output buffer 14L, 14R. The input terminal of the RXC 32 is connected to the output terminal of the input buffer 11L, 11R and the input terminal of the output buffer 14L, 14R.

The access point 7(1) includes only the input buffer 11R and the output buffer 14R. The access point 7(N) includes only the input buffer 11L and the output buffer 14L (not shown). The access points 7(3) to 7(N−1), which are not shown, have similar structures as the access point 7(2). Thus, the slotted bus 2 is connected via the access point 7, so that the bidirectional ring bus is formed.

Figure 2:
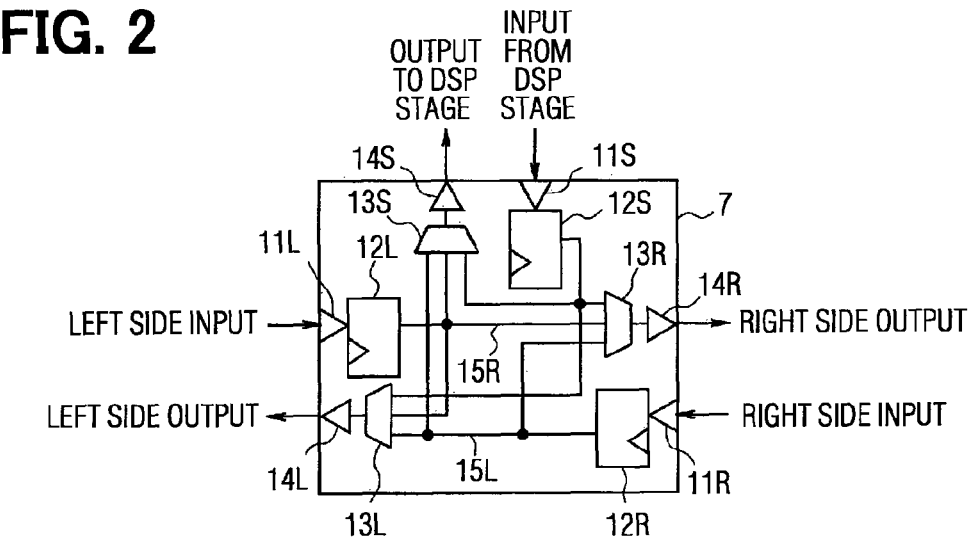
FIG. 2 is a diagram showing a construction of an access point.

As shown in FIG. 2, the access point 7 includes three data input ports and three data output ports. The access point 7 further includes three input buffers 11S, 11L, 11R, three data latches 12S, 12L, 12R, three multiplexers 13S, 13L, 13R, and three output buffers 14S, 14L, 14R, which correspond to the data input ports and the data output ports.

The data input via the write only bus 8 (i.e., a second data bus) of the DSP stage 1 is latched to the data latch 12S via the input buffer 11S. The output terminal of the data latch 12S is connected to one of three input terminals of three-input multiplexer 13S, 13L, 13R. The data input from the slotted bus 2R, which is connected to the left side of the drawing of FIG. 1, is latched to the data latch 12L via the input buffer 11L. The output terminal of the data latch 12L is connected to the other one of input terminals of the multiplexers 13S, 13L, 13R via the right direction bus 15R.

The data input from the slotted bus 2L, which is connected to the right side of the drawing of FIG. 1, is latched to the data latch 12R via the input buffer 11R. The output terminal of the data latch 12R is connected to the remaining one of the input terminals of the multiplexer 13S, 13L, 13R via the left direction bus 15L. The output terminal of the multiplexer 13S, 13L, 13R is connected to the input terminal of the output buffer 14S, 14L, 14R, respectively.

The output terminals of the output buffers 14S, 14L, 14R are connected to the write only bus 9 of the DSP stage 1, the slotted bus 2L connected to the left side of the access point 7, the slotted bus 2R connected to the right side of the access point 7, respectively. Here, the data control unit (not shown) of the access point 7 executes a latch control operation of the data latch 12, the selection control operation of the multiplexer 13 and enable control operation of the output buffer 14. A direction, to which the input data is output, is determined by an address attached to the data.

Thus, the data output to the write only bus 8 by the PE 3 is capable of outputting to the slotted bus 2R on the right side via the multiplexer 13R and the output buffer 14R. Further, the data output to the write only bus 8 by the PE 3 is capable of outputting to the slotted bus 2L on the left side via the multiplexer 13L and the output buffer 14L. Further, the data output to the write only bus 8 by the PE 3 is capable of outputting to the write only bus 9 of the DSP stage 1 via the multiplexer 13S and the output buffer 14S. Each PE 3 writes the data in the stage memory 4 of the DSP stage 1 along these routes.

When the data is output via the access point 7, and the collision with the writing operation of other stage occurs, the data is output in turn according to the priority order, which is determined by an adjusting method such as a Round-Robin method.

Here, the data latch 12S, and the multiplexer 13R, 13L correspond to the TXC 31. The data latch 12L, 12R and the multiplexer 13S correspond to the RXC 32.

Figure 3:
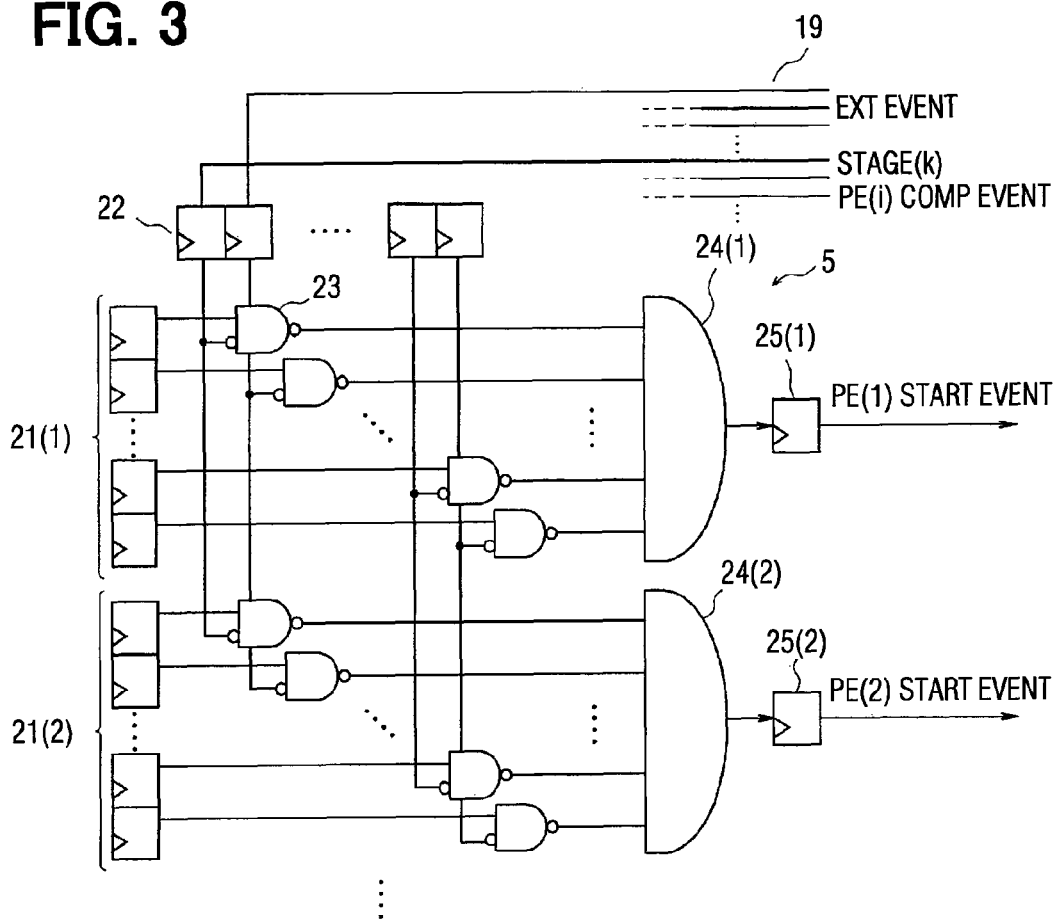
FIG. 3 is a diagram showing a construction of an event controller.

As shown in FIG. 3, the event controller 5 includes a PE event selection unit 21(1), 21(2), . . . 21(M), which corresponds to each PE 3(1, 1), 3(1, 2), . . . 3(1, M) and a complete event list unit 22. Each PE event selection unit 21(1), 21(2), . . . 21(M) is collectively defined as a PE event selection unit 21. Each of the PE event selection unit 21 and the complete event list unit 22 includes the same number of flip-flop circuits. The controller 5 further includes the same number of NAND gates 23. One of the input terminals of the NAND gate 23 is connected to the output terminal of the flip-flop circuit on the PE event selection unit side. The other of the input terminals of the NAND gate 23, which is a negative logic terminal, is connected to the output terminal of the flip-flop circuit on the complete event list unit side. The input terminal of the flip-flop circuit is connected to the RXC 32 in FIG. 2B via the write only bus 10.

The output terminal of each NAND gate 23 is connected to the input terminal of a multi-input AND gate 24(1), 24(2), . . . 24(M) corresponding to each PE 3(k, 1), 3(k, 2), . . . 3(k, M). Here, k represents the number between 1 and N. The output terminal of each AND gate 24(1), 24(2), . . . 24(M) is connected to the input terminal of the flip-flop circuit 25(1), 25(2), . . . 25(M). Each AND gate 24(1), 24(2), . . . 24(M) is collectively defined as a AND gate 24, and each flip-flop circuit 25(1), 25(2), . . . 25(M) is collectively defined as a flip-flop circuit 25.

When each PE 3 starts to execute a corresponding task process, the PE event selection unit 21 preliminary selects an event, which is executed by another PE 3 and necessary to be completed, or which is another external event and necessary to be completed. The selection is preliminary performed by a host device described later. Here, a not-selected event has an output, which is a low level. Thus, the output of the corresponding NAND gate 23 is a high level even if the corresponding event is not completed. On the other hand, since the output of the selected event is a low level, the output of the corresponding NAND gate 23 is a high level when the corresponding event is completed.

When all of events preliminary selected by the PE 3 are completed, the output of the corresponding AND gate 24 becomes a high level, and the event start information (i.e., the task start event information) is notified as an interruption to the PE 3 via the flip-flop circuit 25. The PE 3 receiving the notification starts to execute the task, which is required to execute.

Figure 4:
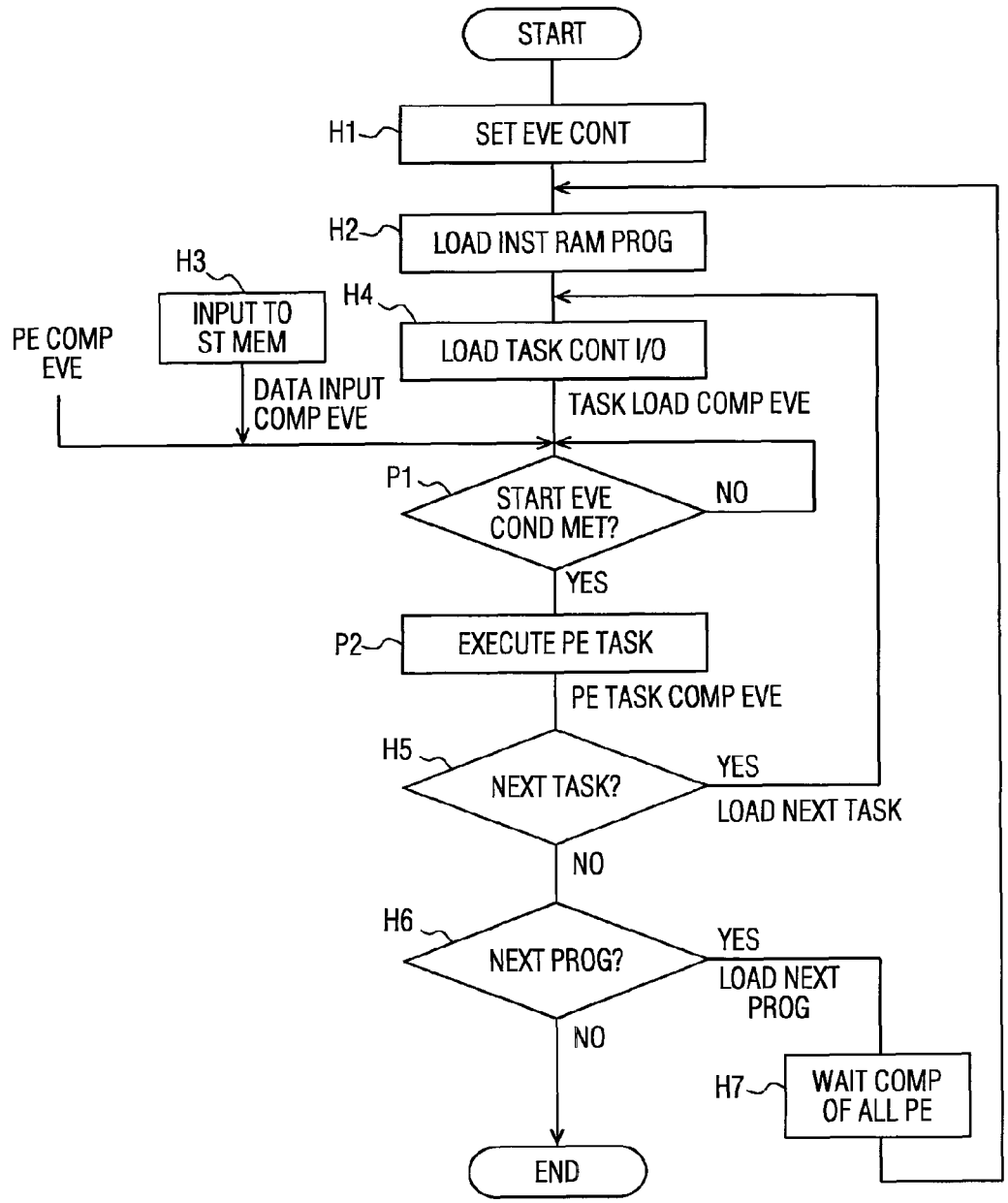
FIG. 4 is a flowchart showing a series process of a host device and the PE.

Next, functions of the data processing device according to a first embodiment will be explained. The host device in FIG. 4 corresponds to the external module in FIG. 1. The host device totally controls the execution of the task by the PE 3 at each DSP stage 1. Specifically, the detail will be described later. The host device selects an event of the event controller 5 at each DSP stage 1 in order to wait for a completion of the event at step H1 using the PE event selection unit 21 corresponding to each PS 3. Then, at step H2, the program is loaded to the instruction memory (not shown but common to each PE 3) at each DSP stage 1. The, at step H3, the data is input into the stage memory 4. Then, at step H4, the register value is loaded to the task control register 35.

Each PE 3 stands by at step P1 until an event condition for starting to execute each task is met. When all of the completion events of other selected PEs 3 occurs, and the interruption of the PE start event occurs at the PE 3 (i.e., when the determination at step P1 is "YES"), it goes to step P2. At step P2, the PE 3 starts to execute the task, which is assigned to the PE 3. Then, when the PE 3 completes to execute the task, the PE 3 generates the task completion event.

The occurrence of the task completion event is notified to the host device. Then, the host device determines at step H5 whether the PE 3, which has generated the event, has a next task to be processed. When the PE 3 has the next task, i.e., when the determination of step H5 is "YES," it returns to step H4. At step H4, the register value indicative of the next task to be processed is loaded to the corresponding task control register 35. On the other hand, when the PE 3 does not have the next task, i.e., when the determination of step H5 is "NO," it goes to step H6. At step H6, it is determined whether the PE 3 at the corresponding DSP stage 1 has a next program to be executed. When the PE 3 has the next program, i.e., when the determination at step H6 is "YES," it goes to step H7. At step H7, the host device stands by until all of PEs 3 in the corresponding DSP stage 1 complete to execute tasks, respectively. Then, it goes to step H2, and the next program is loaded. When the PE 3 does not have the next program, i.e., when the determination at step H6 is "NO," the host device ends the process. Thus, the process executed by the data processing device is described.

Figure 5:
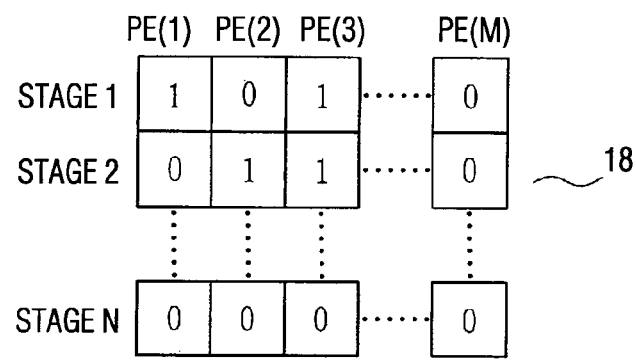
FIG. 5 is a diagram showing an example of an access table.

Next, a memory access (i.e., MA) to the stage memory 4 executed by each PE 3 an event access (i.e., EA) executed by each PE 3 will be explained as follows. The PE 3 performs the MA to the stage memory 4, which is an object for writing data therein. After the PE 3 writes the data to the stage memory 4, the PE 3 executes the EA. As shown in FIG. 5, the access table 33 shows a matrix having rows defined by the number of the DSP stages 1(1), 1(2), . . . 1(N) and columns defined by the number of PE 3(k, 1) to 3(k, M). Here, k represents the number between 1 and N. For example, when the PE 3(1, 1) accesses the memory 4 at the DSP stage 1(1), a flag of a corresponding matrix element is set to be "1." After that, when the PE 3(1, 1) executes the EA, the flag is returned to be "0" using the TXC 31.

Figure 6:
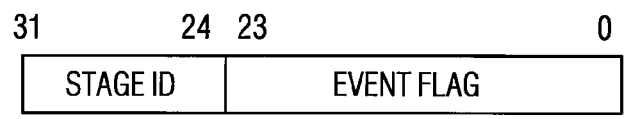
FIG. 6 is a diagram showing an example of a EA data format.
Figure 7:
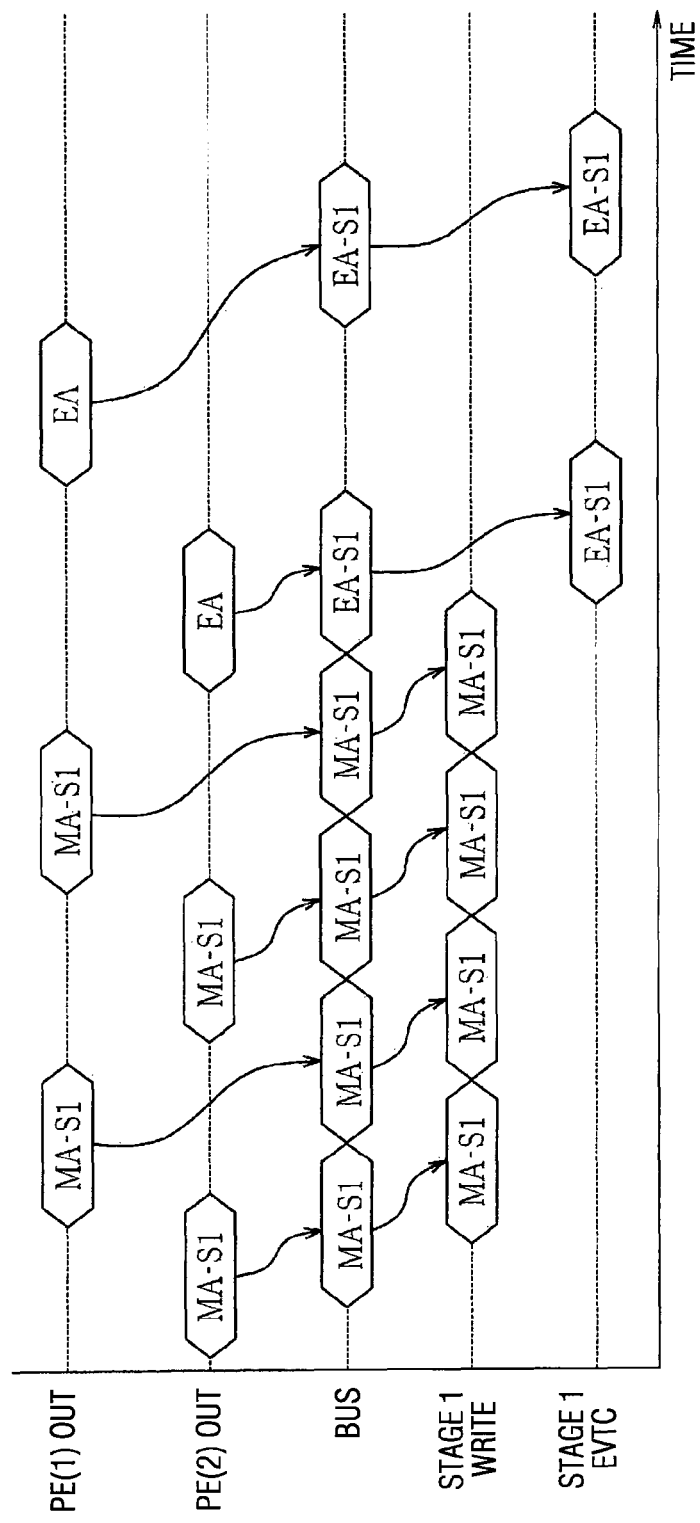
FIG. 7 is a timing chart showing a case where two PEs perform a MA operation and a EA operation, respectively.

The PE 3 executes the EA by writing to the specific address, which is preliminary assigned. Thus, the TXC 31 refers the access table 33, and the TXC 16 issues EA data having a format shown in FIG. 6 in accordance with information which stage memory 4 the corresponding PE 3 accesses to until the present time. The EA data has a 32-bit constitution, for example. A part of the EA data having 8 bits on the MSB side specifies the number of the DSP stage, and the other part of the EA data having 24 bits specifies the PE 3 to generate the event. Thus, in the event controller 5 at the corresponding DSP stage 1, the event flag is set at one of the completion event list unit 22 in the corresponding PE 3.

Figure 8:
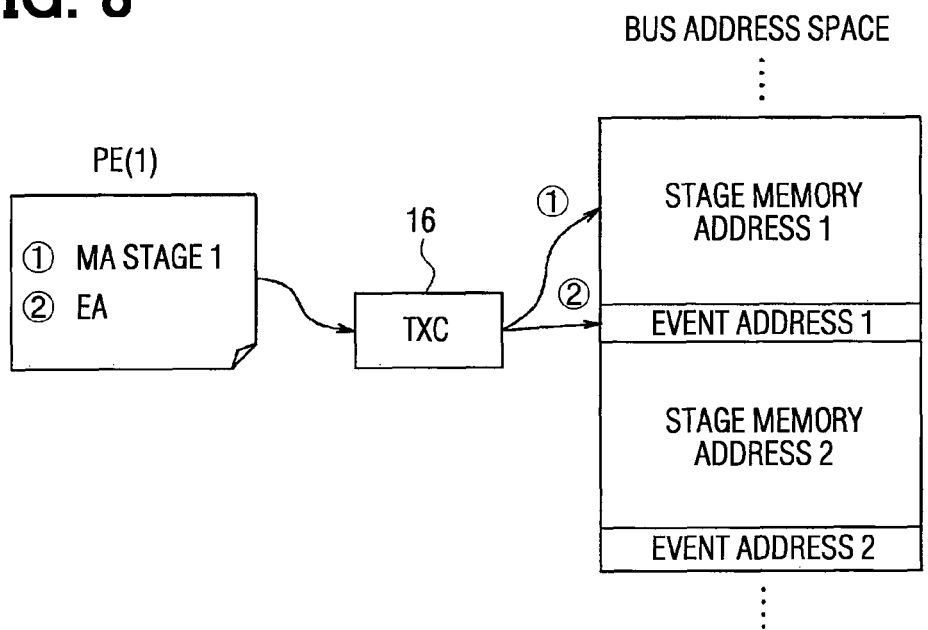
FIG. 8 is a diagram showing an address in a bus address space when the PE performs the MA operation and the EA operation.

For example, as shown in FIG. 8, firstly, the PE 3(1, 2) executes the MA to the memory 4 at the DSP stage 1(1). Then, the PE 3(1, 1) executes the MA to the same stage memory 4 at the DSP stage 1(1). Then, the PE 3(1, 2) executes the MA to the same stage memory 4 at the DSP stage 1(1). After that, the PE 3(1, 2) executes the EA, so that the TXC 31 at the DSP stage 1(1) refers to the access table 33. Thus, it is determined that the PE 3(1, 2) executes the MA to the DSP stage 1(1) until the present time. Thus, the TXC 31 executes the EA with respect to the DSP stage 1(1), so that the TXC 31 issues the EA data. As a result, in the event controller 5 at the corresponding DSP stage 1, the event flag is set at one of the completion event list unit 22 of the corresponding PE 3. After that, when the PE 3(1, 1) executes the EA, the same processing as above is executed.

Figure 9:
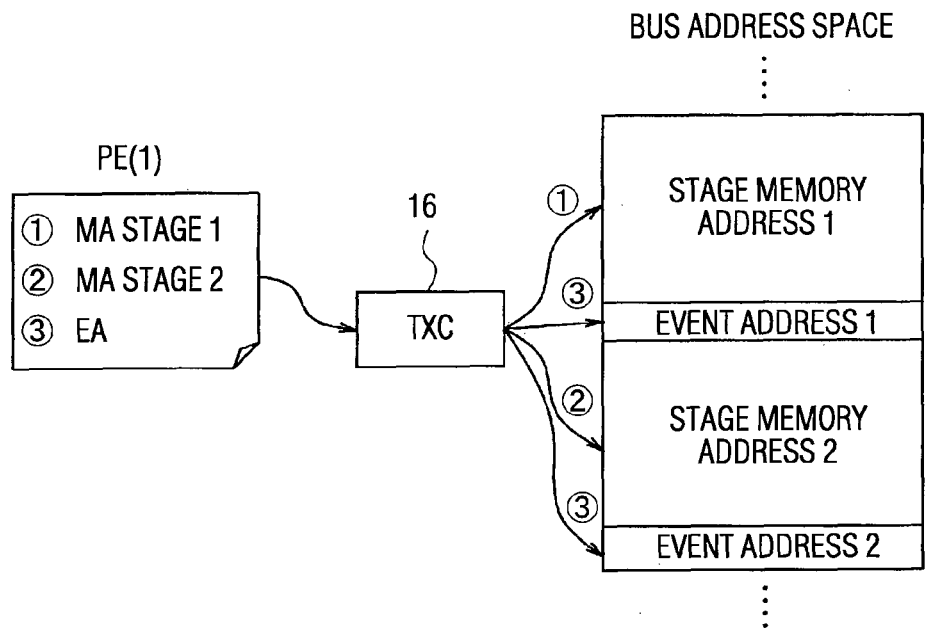
FIG. 9 is a diagram showing the address in the bus address space when the PE performs the MA operation and the EA operation.

As shown in FIG. 8, when the PE 3(1, 1) executes the MA to the memory 4 of the DSP stage 1(1), the writing address (i.e., the address in the bus address space) with respect to the memory 4 is output through the TXC 31. Then, when the PE 3(1, 1) executes the EA, the TXC 31 outputs the address for accessing the event controller 5 of the DSP stage 1(1). Further, as shown in FIG. 9, when the PE 3(1, 1) executes the MA to the memory 4 at the DSP stage 1(1) and the memory 4 at the DSP stage 1(2), the writing address with respect to each memory 4 of the DSP stages 1(1), 1(2) is output through the TXC 31. After that, when the PE 3(1, 1) executes the EA, the TXC 31 outputs the address for accessing each event controller 5 of the DSP stages 1(1), 1(2).

Figure 10:
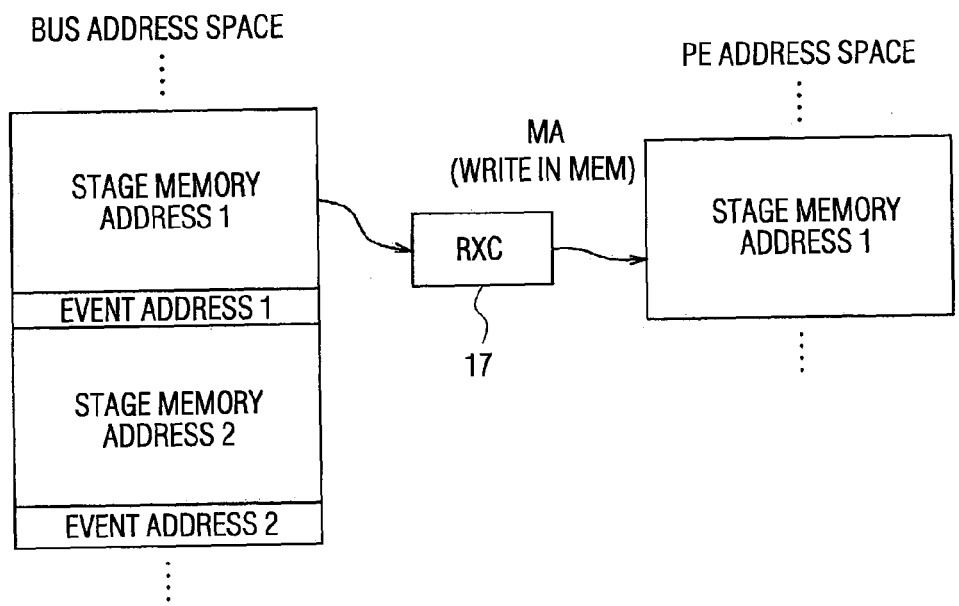
FIG. 10 is a diagram showing an address in a PE address space when the PE performs the MA operation.
Figure 11:
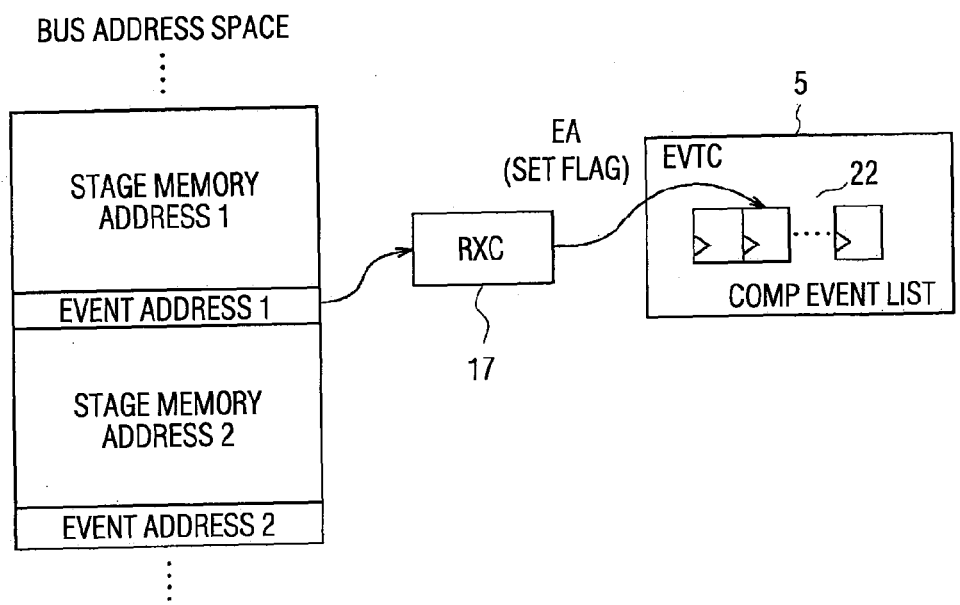
FIG. 11 is a diagram showing an address in a PE address space when the PE performs the EA operation.

As shown in FIG. 10, in a case shown in FIG. 8, when the writing address with respect to the memory 4 of the DSP stage 1(1) is output, the data is written in the memory 4 via the RXC 32 of the DSP stage 1(1). When the EA to the DSP stage 1(1) is executed, as shown in FIG. 11, the event flag is set in one of the completion event list unit 22 at the event controller of the DSP stage 1(1) through the RXC 32.

Thus, in the present embodiment, each DSP stage 1 includes multiple PEs 3, the stage memory 4 and the event controller 5. The slotted bus 2 connects among multiple DSP stages 1. In one of the DSP stages 1, the PE 3 and the stage memory 4 are connected to each other via the read only bus 6, and the PE 3 and the slotted bus 2 are connected to each other via the write only bus 8. The external event, which is generated by an external device, and/or the process completion event from the PE 2 are input into the event controller 5. The event controller 5 generates the task start event with respect to the PE 3 at the one of the DSP stages 1 according to each event inputted therein.

The PE 3 in the DPS stage 1 reads out the data as a processing object from the stage memory 4 via the read only bus 6. The processed data is written in the memory 4 of another one of the DSP stages 1 via the slotted bus 2, which is a write only bus. Thus, the data transfer direction between the PE 3 and the memory 4 is fixed. Further, the coherency management of the memory 4 is performed by generating the event at the another one of the DSP stages 1 via the access point 7 and the event controller 5 after each PE 3 writes in the memory 4 of the another one of the DSP stages 1. Thus, the area of the hardware is reduced, and the processing speed is improved.

Further, the two-way (bidirectional) slotted bus 2 including two busses, which are independent from each other, and have different data writing directions, has a structure, which executes the pipeline process of the software and is designed with high designing degree of freedom compared with a single data writing direction ring bus. Accordingly, various algorisms are provided by the same hardware. Thus, the hardware resource is much effectively used, so that the energy consumption is reduced.

Each DSP stage 1 and the slotted bus 2 are connected to each other via the access point 7. The access point 7 stores the writing history in the access table 33 when the PE 3 performs the MA on the stage memory 4. After the PE 3 performs a series of the MA on the stage memory 4, the PE 3 executes the EA, which indicates that the MA is completed. When the EA is performed, the access point 7 executes the EA for inputting the process completion event into the event controller 5 of the DSP stage 1 including the stage memory 4, to which the MA is performed, based on the history stored in the access table 33. Thus, the event controller 5 generates the task start event at the PE 3.

Accordingly, the synchronizing of the processes, which are executed by the PEs 3, between the different DSP stages 1 is effectively performed. Further, the access point 7 performs the EA on only the DSP stage, to which the MA is performed by the PE 3 actually. Thus, the usage of the slotted bus 2 is minimized, so that the band of the bus 2 is effectively used, and the process efficiency is improved. The PE 3 executes the EA as a writing process with respect to a specific address. Thus, the EA is realized with a simple processing.

Second Embodiment

Figure 12:
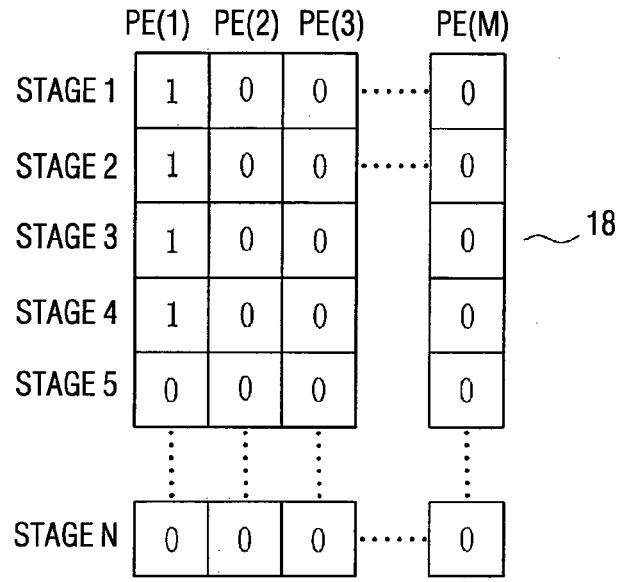
FIG. 12 is a diagram showing an access table when the same PE performs the MA in multiple stage memories according to a second embodiment.
Figure 13:
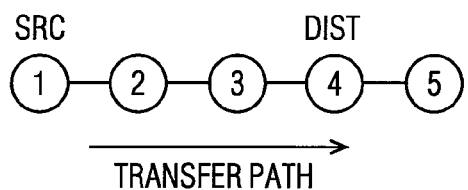
FIG. 13 is a diagram showing a multiple casts of the EA.

As shown in FIG. 12, the PEs 3(1, 1) to 3(4, 1) execute the MA on the DPS stages 1(1) to 1(4). In this case, when the PE 3(1, 1) executes the EA, the TXC 31 performs the EA serially from the DSP stage 1(1) to the DSP stage 1(4) with reference to the access table 33, as shown in FIG. 13. Here, in FIG. 13, the number in a circle represents the number of the DSP stage 1. Specifically, the DSP stage 1(1) is defined as "src," and the DSP stage 1(4) is defined as "dist." This process is defined as a multi-cast process.

Figure 14:
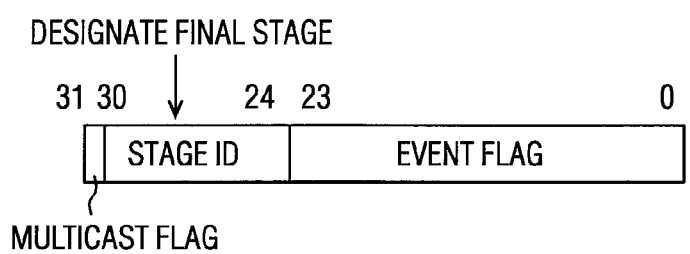
FIG. 14 is a diagram showing an example of a EA data format, which is used when the multiple casts are performed.

In the above case, the TXC 31 of the stage 1(1) as an execution source transmits the EA data shown in FIG. 14. The bit 31 as a MSB is used for the storing region of the multi-cast flag. When the multi-cast process is performed, the value of the flag is set to be "1." The stage ID is designated to the stage ID of the final stage 1 of the execution object. In FIG. 13, the stage ID of the final stage 1(4) is "4," and the stage ID is designated to "4."

As shown in FIG. 15, the RXC 32 of the stage 1, which receives the EA data, determines at step S1 with reference to the multi-cast flag whether a process is the multi-cast process. When the process is not the multi-cast process, i.e., when the determination at step S1 is "NO," it goes to step S5. At step S5, other receiving process is executed. When the process is the multi-cast process, i.e., when the determination at step S1 is "YES," it goes to step S2. At step S2, the EA is performed to the event controller 5 of the subject stage. Specifically, the RXCs 32 of all stages 1, which receive the EA data, execute the EA. The determination whether the EA is transmitted to the PE 3 of the subject stage 1 via the event controller 5 is decided according to the determination whether the PE event selection unit 21 preliminary selects the transmission.

Next, the RXC 32 determines at step S3 whether the stage ID designated by the EA data is the subject stage ID. When the stage ID is the subject stage ID, i.e., when the determination at step S3 is "YES," the process ends since it means that the EA data reaches the final stage 1 as the execution object of the multi-cast process. When the stage ID is not the subject stage ID, i.e., when the determination at step S3 is "NO, it goes to step S4. At step S4, the EA data is transferred to the next stage 1 adjacent to the subject stage 1, and the process ends.

Thus, in the second embodiment, the TXC 31 of the access point 7 executes the multi-cast process for serially executing the EA on the DSP stages 1 corresponding to multiple stage memories 4, to which the PEs 3 execute the MA, when the EA is performed. Thus, the PE 3 executes the EA only once even when multiple stage memories 4 execute the MA.

Third Embodiment

In the third embodiment, similar to the first embodiment, the slotted bus 2 connects between the DSP stages 1. The execution source of the EA is the access point 7 of the DSP stage 1(4), and the execution object of the EA is the access points 7(2), 7(3), 7(5), 7(8), the multi-cast process is performed. Here, no loop path is arranged on both sides of the slotted bus 2, so that the ring bus is not formed. In this case, the access point 7(4) provides a starting point. FIG. 17 shows the number of hops (i.e., the number of paths of the bus) for accessing each access point 7(2), 7(3), 7(5), 7(8).

Accordingly, the TXC 31 of the access point 7(4) executes the multi-cast process with designating the access point 7(2) on the left direction of the slotted bus 2, as shown in FIG. 16. The TXC 31 executes the multi0-cast process with designating the access point 7(8) on the right direction of the slotted bus 2. Thus, the number of hops is minimized, and the EA is performed to all of the execution objects of the stage 1. The access point 7 as the execution source of the EA is defined as the starting point. The number of hops on the right/left direction and the access order are considered in view of the access points 7 as the execution object, so that the process time for completing the multi-cast process is minimized.

In the third embodiment, each access point 7 is selected to minimize the total of path lengths for accessing all of multiple DSP stages 1 when the EA is performed to multiple DSP stages 1. Specifically, the slotted bus 2 and the access point 7 provide the bidirectional bus, at least one of the stage memories 4, to which the MA is performed, is disposed on one side from the subject DSP stage 1 as the starting point, and at least one of the stage memories 4, to which the MA is performed, is disposed on the other side from the subject DSP stage 1. In this case, the access point 7 as the execution source of the EA performs the multi-cast process in two directions with the DSP stage 1 of the subject access point 7 as the starting point. Thus, the total path length for executing the EA to all of the DSP stages as the objects is minimized. Accordingly, the process time for executing the EA is minimized, and the process efficiency is improved.

Fourth Embodiment

Figures 18, 19:
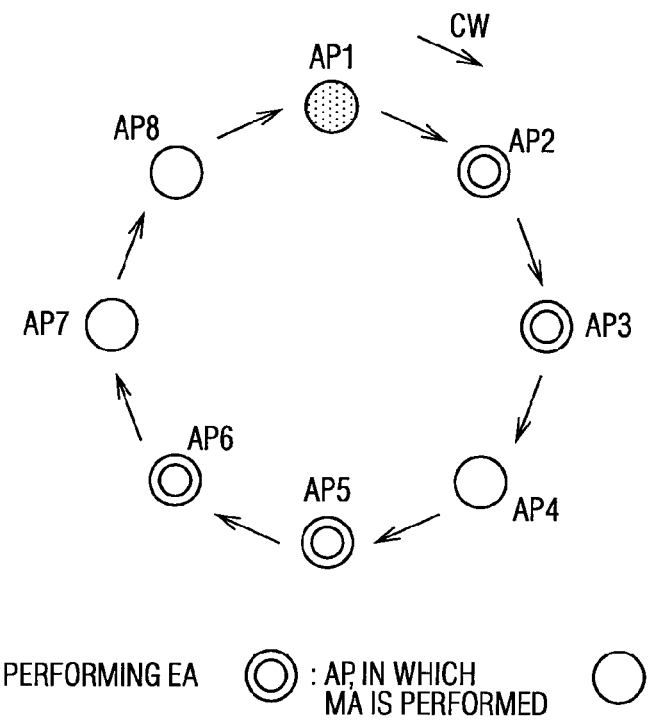
FIG. 18 is a diagram showing an example where the multiple casts are performed at a single direction bus according to a fourth embodiment.
FIG. 19 is a diagram showing the number of hops for performing the EA at each stage.

In the third embodiment, the slotted bus 2 connects the access points 7. In the fourth embodiment, as shown in FIG. 18, a single direction ring bus connects the access points 7. The execution source of the EA is the access point 7(1), and the execution objects of the EA are the access points 7(2), 7(3), 7(5), 7(6). The multi-cast process is performed in these situations. In this case, the access point 7(1) provides the starting point, and the number of hops for accessing the access points 7(2), 7(3), 7(5), 7(6) is shown in FIG. 19. Accordingly, the TXC 31 of the access point 7(1) designates the access point 7(6), and performs the multi-cast process.

Fifth Embodiment

Figures 20, 21:
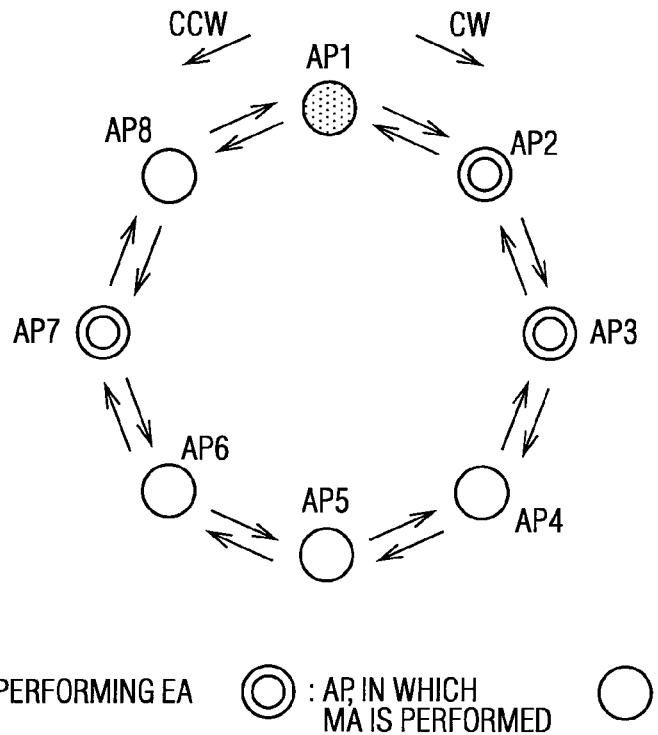
FIG. 20 is a diagram showing an example where the multiple casts are performed at a bidirectional bus according to a fifth embodiment.
FIG. 21 is a diagram showing the number of hops for performing the EA at each stage.

In the fifth embodiment, as shown in FIG. 20, the bidirectional ring bus connects the access points 7. The execution source of the EA is the access point 7(1), and the execution objects of the EA are the access points 7(2), 7(3), 7(7). In these situations, the multi-cast process is executed.

When the bidirectional ring bus is used, and the access point 7(1) provides the starting point, the access point 7(1) accesses other access points 7(2), 7(3), 7(7) in a clockwise path (i.e., CW path) or a counter-clockwise path (i.e., CCW path). When the access point 7(1) is the starting point, and the number of hops for accessing the access points 7(2), 7(3), 7(7) in one of the clockwise path and the counter-clockwise path is shown in FIG. 21.

In the above case, the TXC 31 of the access point 7(1) designates the access point 7(3) in the clockwise path, and designates the access point 7(7) in the counter-clockwise path. Thus, the multi-cast process is performed.

Sixth Embodiment

Figure 22:
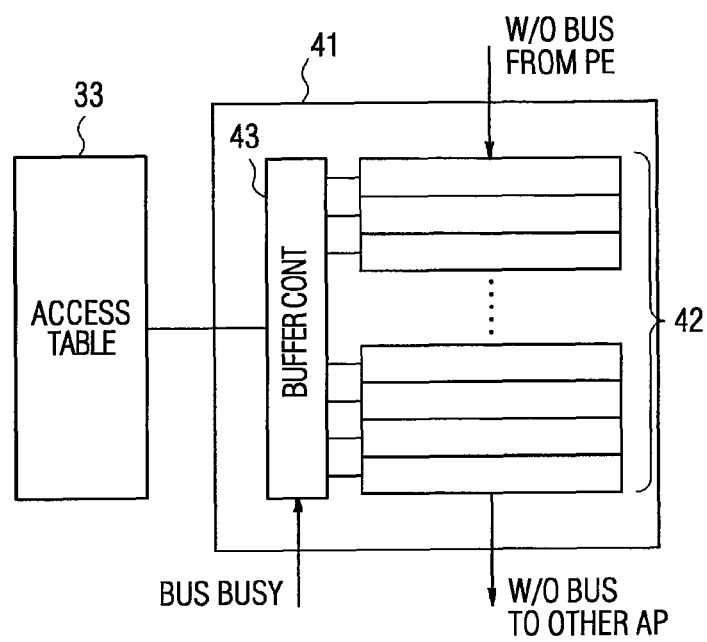
FIG. 22 is a block diagram showing a functional structure of the TXC according to a sixth embodiment.

In the sixth embodiment, when the EA is generated at multiple PEs 3, which are disposed on the same DSP stage 1, multiple EAs are merged according to a condition of the usage of the bus 2. Thus, the TXC 41 includes the buffer 42 and the buffer controller 43, as shown in FIG. 22. The busy signal (i.e., Bus Busy signal) output from a bus controller (not shown) is input into the buffer controller 43 when the TXC 41 of other stage 1 uses the bus 2.

The buffer controller 43 stores the MA or the EA in the buffer 42 when the PE 3 of the subject stage 1 executes the MA or the EA, and the busy signal is in an active since the MA or the EA is not capable of outputting to the bus 2. Further, the buffer controller 43 executes the merging process for merging multiple EAs, and switches the outputting order of the MA and the EA, which are stored in the buffer 42.

Figure 23:
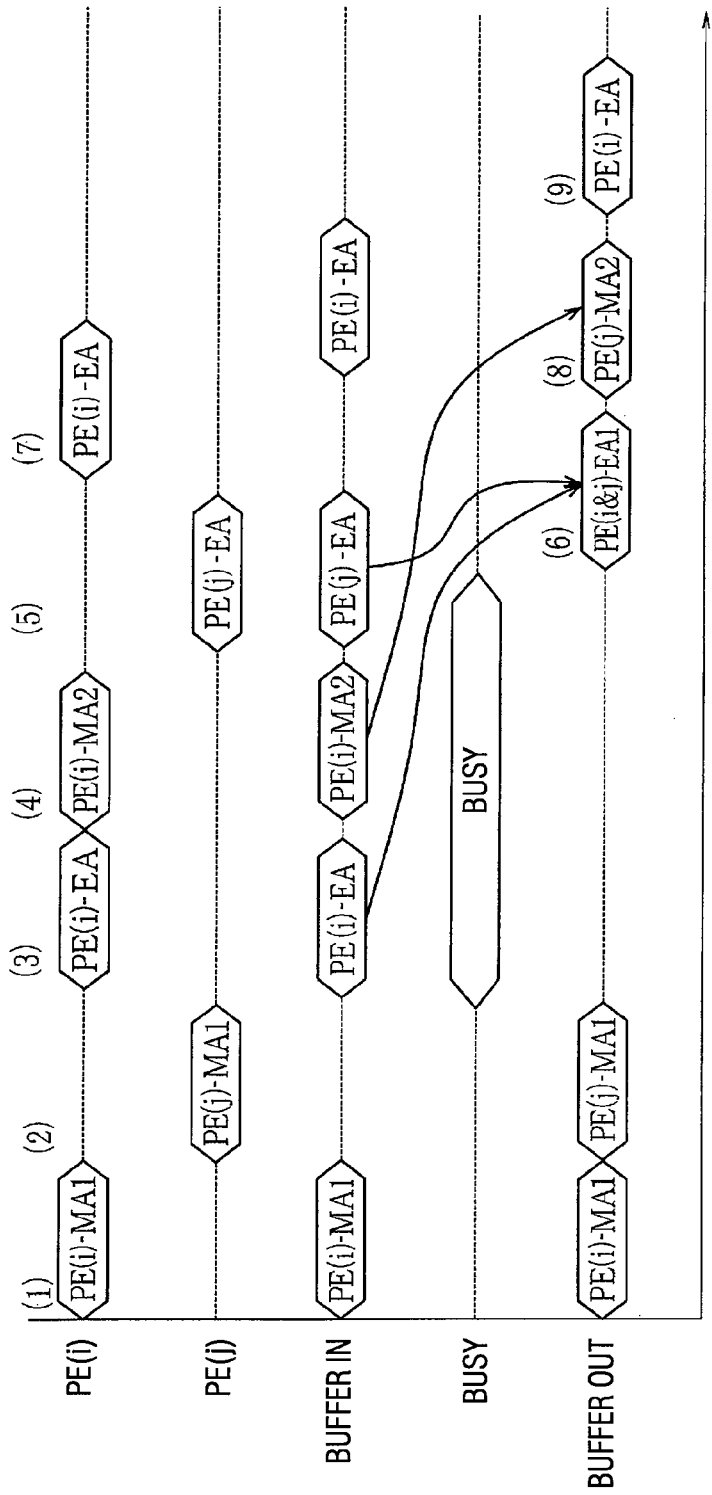
FIG. 23 is a timing chart showing a process for merging multiple EAs.

Next, the effects of the sixth embodiment will be explained as follows. As shown in FIG. 23, the PE 3(*i*) and the PE 3(*j*) are disposed on the same stage 1. At time (1), the PE 3(*i*) executes the MA to the stage 1(1), which is defined as MA1. At time (2), the PE 3(*j*) executes the MA1. At time (3), the PE 3(*i*) executes the EA, and the busy signal is in an active. Thus, the EA is stored in the buffer 42. At time (4), the PE 3(*i*) executes the MA2, and the busy signal is in an active. Thus, the MA2 is stored in the buffer 42.

At time (5), the PE 3(*j*) executes the EA, and the busy signal is in active. Thus, the EA is stored in the buffer 42. In this case, the TXC 41 determines based on the access table 33 and the buffer 42 that the execution objects of the EA by the PE 3(*i*) and the PE 3(*j*) are disposed on the stage 1(1). Accordingly, the TXC 41 merges the EA of the PE 3(*i*) and the EA of the PE 3(*j*), and generates the merged EA1 at time (6) when the busy signal is inactive. This output of the merged EA1 is defined as a buffer out.

Then, at time (7), the PE 3(*i*) executes the EA, which corresponds to time (4). The MA2 stored in the buffer 42 is executed prior to the EA at time (8). Then, at time (9), the EA is executed after that.

Thus, in the sixth embodiment, when the MA or the EA is generated in the busy state, in which the data transfer to other access point 7 is unable, the generation of the access of the MA or the EA is temporally stored in the buffer. The TXC 41 merges multiple EAs and then executes the merged EA when multiple EAs are generated by the PE 3 in the subject stage 1, and the relationship of the execution order between the MA stored in the buffer 42 and multiple EAs is not changed.

Specifically, when the PE 3(*i*) executes the EA firstly, and the PE 3(*j*) executes the EA after the PE 3(*i*), the EA of the PE 3(*i*) is merged with the EA of the PE 3(*j*), and the merged EA is executed if the MA of the PE 3(*j*) is not generated in the busy state. Accordingly, multiple EAs are executed as a job lot. Thus, the process efficiency is improved.

Seventh Embodiment

Figure 24:
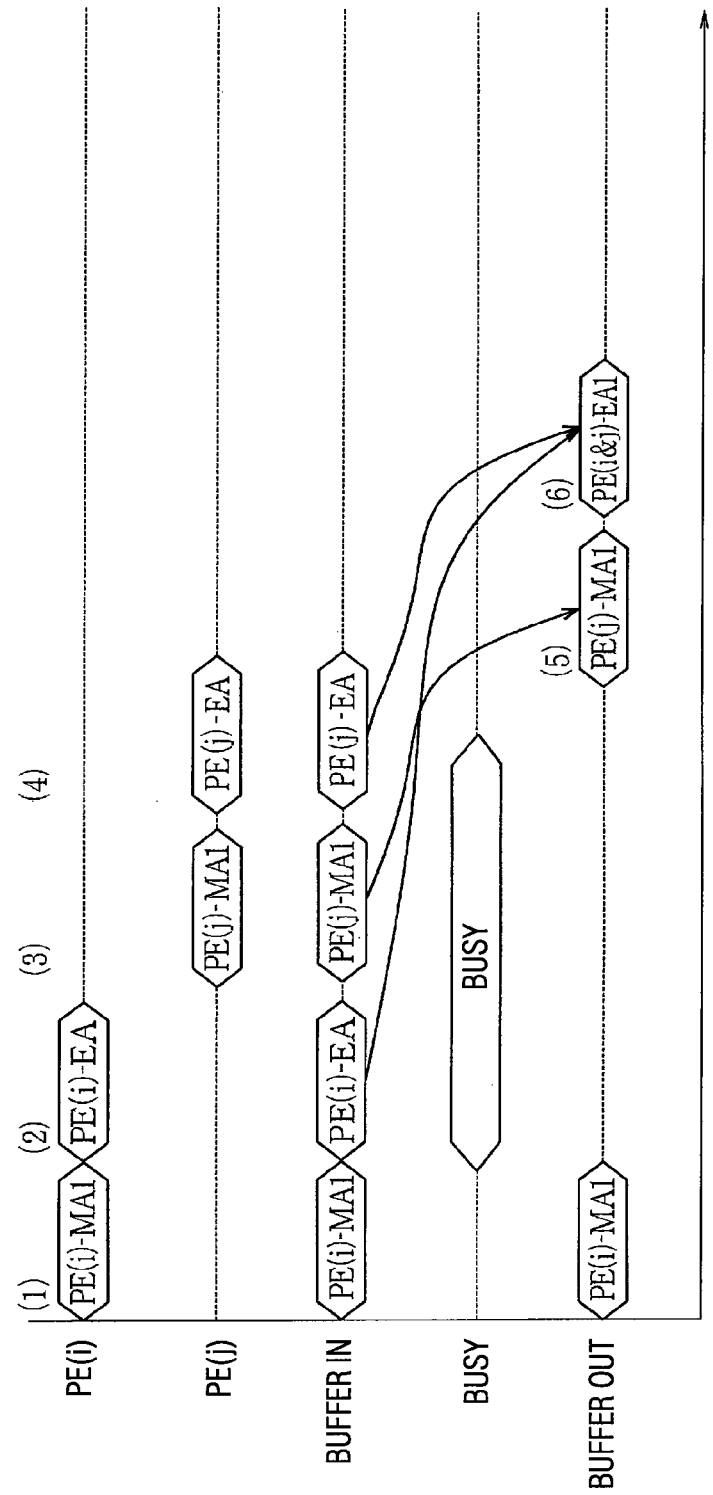
FIG. 24 is a timing chart showing a process for merging multiple EAs according to a seventh embodiment.

In the seventh embodiment, multiple EAs are merged in another way. As shown in FIG. 24, at time (1), the PE 3(*i*) executes the MA1, and at time (2), the PE 3(*i*) executes the EA. In this case, the busy signal is in active. Next, at time (3), the PE 3(*j*) executes the MA1, and at time (4), the PE 3(*j*) executes the EA. Here, the busy signal is active just after the EA is executed. At this time, the buffer 42 stores the EA of the PE 3(*i*), the MA1 of the PE 3(*j*) and the EA of the PE 3(*j*) in this order.

Thus, the TXC 41 puts off the execution of the EA with the PE 3(*i*), and firstly executes the MA1 with the PE 3(*j*) at time (5). Then, the TXC 41 merges the EA with the PE 3(*i*) and the EA with the PE 3(*j*), and executes the merged EA in block at time (6).

In the seventh embodiment, when the PE 3(*i*) firstly executes the EA, and the PE 3(*j*) executes the EA after that, if the MA with the PE 3(*i*) is not generated in the busy state, the EA with the PE 3(*i*) and the EA with the PE 3(*j*) are merged and executed. In this case, multiple EAs are executed at one time. Thus, the process efficiency is improved.

Eighth Embodiment

Figure 25:
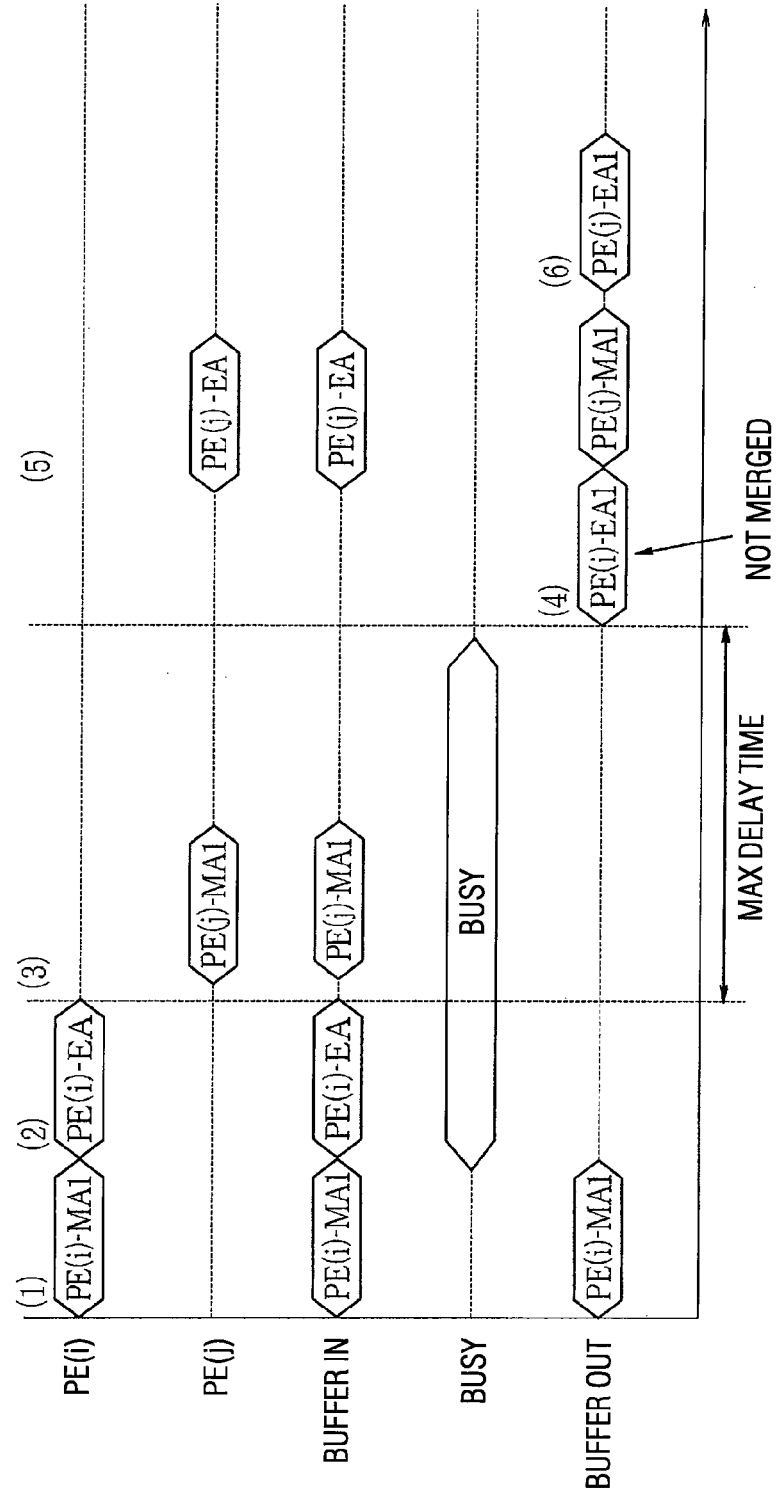
FIG. 25 is a timing chart showing a process for merging multiple EAs according to an eighth embodiment.

In the eighth embodiment, a case similar to the seventh embodiment is assumed, and the EA generated firstly and the EA generated secondly are merged under a condition that the duration time of the busy state is within a predetermined time. As shown in FIG. 25, steps for executing events from time (1) to time (3) are similar to the seventh embodiment. After that, the period, in which the busy signal is in active, is longer than the seventh embodiment.

In the above case, the TXC 41 starts to measure the active period of the busy signal since the EA with the PE 3(*i*) ends at time (2). The TXC 41 monitors whether "the maximum delay time" in FIG. 25 has elapsed. Before the maximum delay time has elapsed, when the PE 3(*j*) starts to execute the EA, the EA with the PE 3(*i*) and the EA with the PE 3(*j*) are merged, similar to the seventh embodiment. When the PE 3(*j*) does not start to execute the EA before the maximum delay time has elapsed, the TXC 41 executes the EA with the PE 3(*i*) at time (4) just after the busy state is switched to inactive. Thus, in this case, since the EA with the PE 3(*i*) and the EA with the PE 3(*j*) are merged, the process efficiency would be reduced if the TXC continues to wait for the execution of the EA with the PE 3(*i*). Thus, in this case, the batch processing with the merge is interrupted.

Thus, in the eighth embodiment, the TXC 41 measures the time interval for continuing the busy state. Under a condition that the duration time of the busy state is within the predetermined time, the EA with the PE 3(*i*) and the EA with the PE 3(*j*) are merged. Thus, the time loss for waiting for the execution of the EA is restricted, so that the process efficiency is not reduced. Here, the step for waiting for the execution of the EA has a purpose to merge the EAs.

Ninth Embodiment

Figure 26:
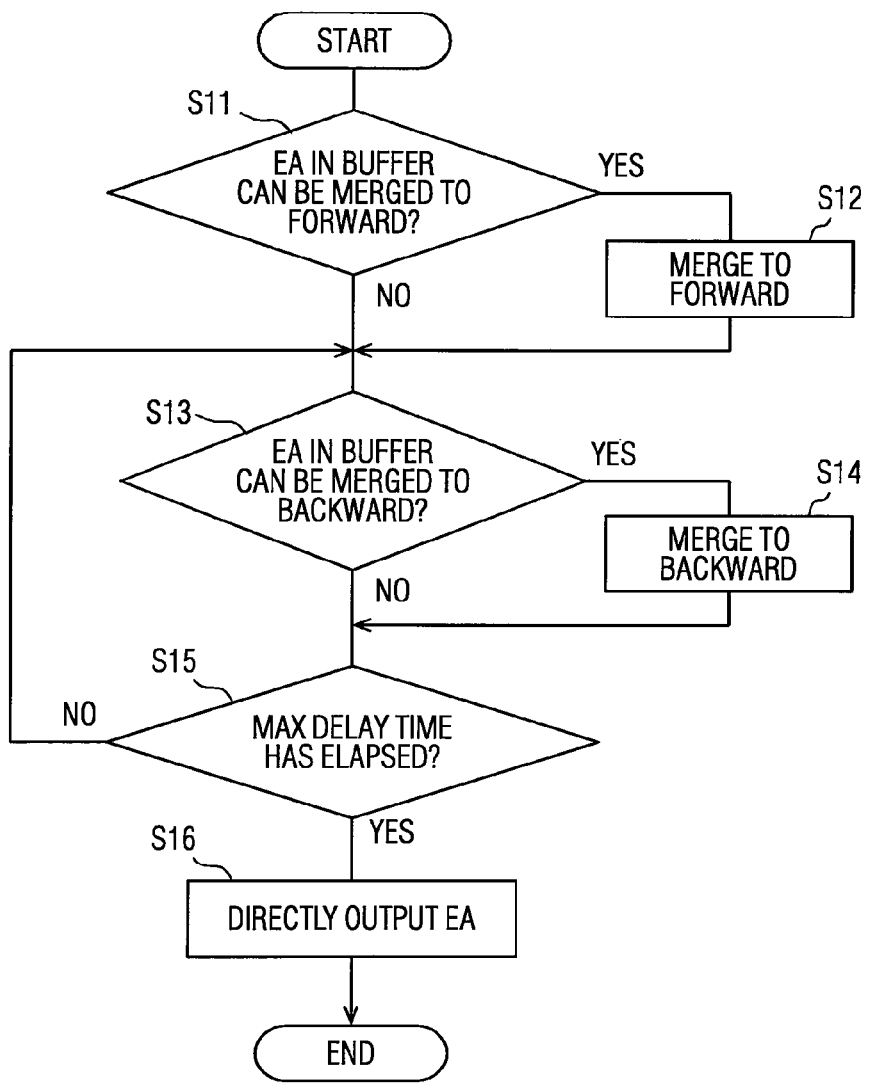
FIG. 26 is a flowchart showing a process for switching execution of various processes in the sixth to eighth embodiments according to a case.

In the ninth embodiment, a procedure for sorting and executing processes in the sixth to eighth embodiments in accordance with a case will be explained. In FIG. 26, the TXC 41 merges the EA with the PE 3(*i*) and the EA with the PE 3(*j*) at step S12, similar to the sixth embodiment, when the EA is received from the subject stage 1, and another EA, which can be merged with the EA, is stored in the buffer 42 in advance (i.e., when the determination at step S11 is "YES").

When the EA, which can be merged with another EA, is stored in the buffer 42 latter (i.e., when the determination at step S13 is "YES"), the EA with the PE 3(*i*) and the EA with the PE 3(*j*) are merged and executed at step S4, similar to the seventh embodiment. When no EA, which can be merged with another EA, is stored in the buffer 42 latter (i.e., when the determination at step S13 is "NO"), it goes to step S15. At step S15, the TXC 41 determines whether the maximum delay time has elapsed. When the maximum delay time does not have elapsed (i.e., when the determination at step S15 is "NO"), it returns to step S13. When the maximum delay time has elapsed (i.e., when the determination at step S15 is "YES"), it goes to step S16. At step S6, the TXC 41 outputs the EA without merge.

Thus, in the ninth embodiment, the processes according to the sixth to eighth embodiments are appropriately selected and executed in accordance with a situation, so that the process efficiency is improved.

Tenth Embodiment

Figure 27:
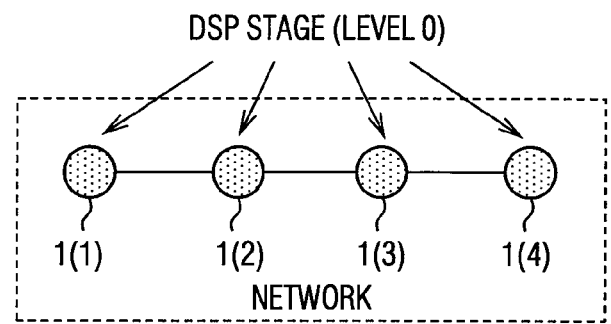
FIG. 27 is a diagram showing a network corresponding to the first embodiment according to a tenth embodiment.
Figure 28:
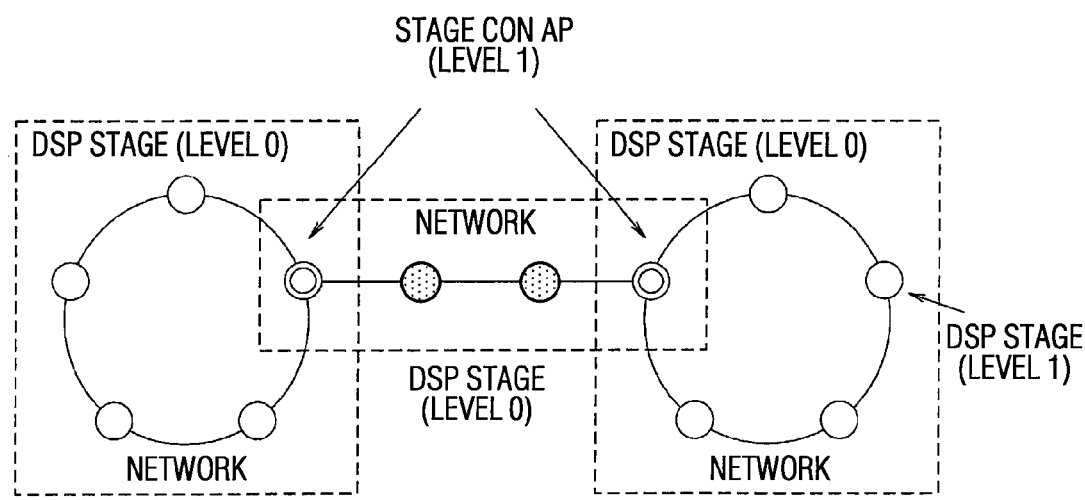
FIG. 28 is a diagram showing the network corresponding to the first embodiment when the number of stages of the network is two.

The data processing device according to the first embodiment has the structure such that each DSP stage 1 has a node, which belongs to the same level (e.g., the level zero), and connected via the bus 2 so that the network having the one level is formed. In the tenth embodiment, as shown in FIG. 27, one network is defined as a DSP stage with the level zero. The DSP stage 1, which belongs to the network, is defined as a node having the level −1, which is lower than the network by one level. As shown in FIG. 28, multiple DSP stages having the zero level are connected with the access point (i.e., AP) for connecting the levels, so that a complex network is formed.

Figure 29:
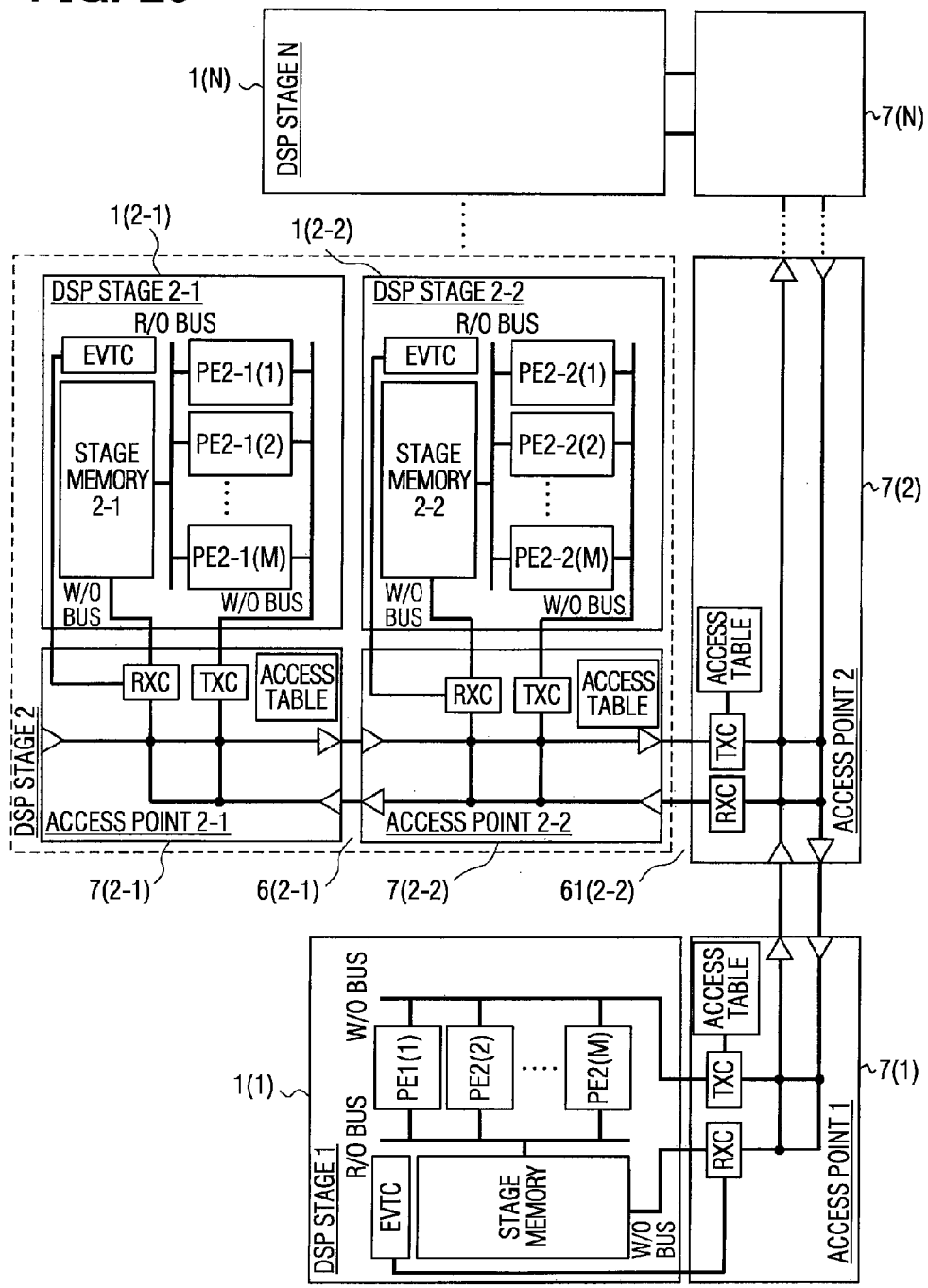
FIG. 29 is a block diagram showing a functional structure of a data processing device in an example of the network shown in FIG. 28.

For example, as shown in FIG. 29, the access point 7(2-2) and the access point 7(2-1) are connected to each other via the in-stage bus 62. In the first embodiment, the access point 7(2) is connected to the DSP stage 1(2). Each of the access point 7(2-2) and the access point 7(2-1) is connected to the DSP stage 1(2-2) and the DSP stage 1(2-1), respectively.

Figure 30:
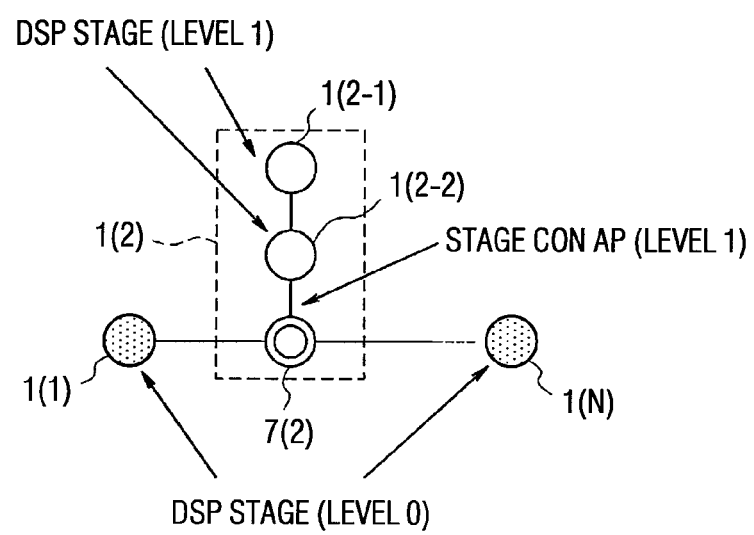
FIG. 30 is a diagram showing a modeled structure in FIG. 29.

Further, FIG. 30 shows a model of the structure in FIG. 29, which is shown in a similar manner of FIG. 28. The access point 7(2) provides the level connection AP. The DSP stage 1(2-2) and the DSP stage 1(2-1) provide the node having the level −1. Assuming that the DSP stage 1(2-2) and the DSP stage 1(2-1) provide one DSP stage 1(2), the DSP stage 1(2) has the zero level.

Here, in order to simplify the drawing of FIG. 29, only the DSP stage 1(2) is an aggregation of the DSP stage 1(2-2) and the DSP stage 1(2-1). Similarly, other DSP stages 1 such as the DSP stage 1(1) may be an aggregation of two or more DSP stages 1(1-2), 1(1-1). Assuming that the stage having the level −1 is defined as a sub-stage, the number of sub-stage may be two or more. When the stages are expanded, the structure of the model in FIG. 28 is formed.

Thus, in the tenth embodiment, multiple DSP stages 1 provide a network node having the upper level of zero, i.e., LEVEL (0). Multiple network nodes are prepared, and the nodes are connected to each other, so that an upper level network is formed. Thus, the network can execute complex processes.

Each DSP stage 1 may include at least one of PEs 3. Alternatively, each DSP stage 1 may include one or more stage memories 4 such as two stage memories 4.

The external event may be generated by a device other than the host device 53.

For example, one of the DSP stages 1 connected to the slotted bus 2 may execute a function of the hos device 53.

It is noted that a flowchart or the processing of the flowchart in the present application includes sections (also referred to as steps), each of which is represented, for instance, as H1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A data processing device comprising:
a plurality of data processing stages, each of which includes at least one processing element, at least one stage memory, and an event controller; and
an inter-stage bus that connects between the plurality of data processing stages, and is a data write only bus,
wherein the processing element in one data processing stage is connected to the stage memory in the one data processing stage via a data read only bus,
wherein the processing element is connected to the inter-stage bus via a second data write only bus,
wherein an external event generated at an external device and a process completion event from the processing element are input into the event controller,
wherein the event controller in the one data processing stage generates a task start event with respect to the processing element in the one data processing stage according to each of the external event and the process completion event,
wherein each of the plurality of data processing stages is connected to the inter-stage bus via an access point,
wherein the access point includes an access table,
wherein the access point stores a data write history in the access table when the processing element writes data in the stage memory in a memory access process,
wherein the processing element executes an event access process indicative of a completion of the memory access process after the processing element completes to execute the memory access process to the stage memory via the access point, and
wherein the access point executes another event access process for inputting the process completion event into the event controller of a data processing stage including the stage memory, in which the processing element writes data in the memory access process, based on the data write history stored in the access table when the processing element executes the event access process.

2. The data processing device according to claim 1, wherein the event access process executed by the processing element is a data write process for a specific address.

3. The data processing device according to claim 1, wherein when the processing element executes the event access process, and the processing element executes the memory access process to two or more stage memories, the access point executes the another event access process sequentially to two or more data processing stages, which correspond to the two or more stage memories.

4. The data processing device according to claim 3, wherein the access point selects one of routes having a minimum path length for accessing all of two or more data processing stages when the access point executes the another event access process sequentially to the two or more data processing stages.

5. The data processing device according to claim 4, wherein each access point and the inter-stage bus provide a bidirectional bus,
wherein at least one of the two or more stage memories, to which the processing element executes the memory access process, is disposed on one side of the data process stage as a starting point,
wherein at least another one of the two or more stage memories, to which the processing element executes the memory access process, is disposed on the other side of the data process stage as the starting point, and
wherein the access point executes the another event access in two directions from the data process stage as the starting point.

6. The data processing device according to claim 1, wherein the access point further includes a buffer for temporarily storing an occurrence of the memory access process or the event access process when the memory access process or the event access process occurs under a condition that a data transfer to another access point is in a busy state so that the access point cannot transfer data to the another access point, and
wherein the buffer merges and executes two or more event access processes when the two or more event access processes are generated at the process element in a same data processing stage under a condition that an execution order of the memory access process stored in the buffer and the two or more event access processes is not changed.

7. The data processing device according to claim 6, wherein the two or more event access processes include a first event access process and a second event access process,
wherein the at least one processing elements includes a first processing element and a second processing element, and
wherein the buffer merges and executes the first event access process with the second event access process when the first processing element executes the first event access process, and the second processing element executes the second event access process after the first processing element executes the first event access process under a condition that the second processing element does not executes the memory access process in the busy state.

8. The data processing device according to claim 6, wherein the two or more event access processes include a first event access process and a second event access process,
wherein the at least one processing elements includes a first processing element and a second processing element, and wherein the buffer merges and executes the second event access process with the first event access process when the first processing element executes the first event access process, and the second processing element executes the second event access process after the first processing element executes the first event access process under a condition that the first processing element does not executes the memory access process in the busy state.

9. The data processing device according to claim 8, wherein the access point measures a duration time of the busy state, and
wherein the buffer merges and executes the second event access process with the first event access process when the duration time is within a predetermined time.

10. The data processing device according to claim 1, wherein each of the plurality of data processing stages is a network node, and
wherein a plurality of network nodes are connected to each other, and the plurality of network nodes provide a network having a level higher than each network node.

\* \* \* \* \*